United States Patent [19]

Asamoto

[11] 3,945,676

[45] Mar. 23, 1976

[54] GRIPPING DEVICE

[75] Inventor: Hiroshi Asamoto, Komatsu, Japan

[73] Assignee: Kabushiki Kaisha Komatsu Seisakusho, Tokyo, Japan

[22] Filed: Sept. 13, 1974

[21] Appl. No.: 505,846

[30] Foreign Application Priority Data
Sept. 14, 1973 Japan.............. 48-107159[U]

[52] U.S. Cl. .................. 294/88; 294/106; 294/115
[51] Int. Cl.² .......................................... B66C 3/16
[58] Field of Search ....... 294/16, 88, 103, 104, 106, 294/115, 116, 118; 214/1 CM, 1 B, 1 BB; 269/32, 34, 257, 264

[56] References Cited
UNITED STATES PATENTS

| | | | |
|---|---|---|---|
| 2,537,607 | 1/1951 | Stone | 294/88 |
| 2,675,935 | 4/1954 | Thurow | 294/88 X |
| 2,725,154 | 11/1955 | Hendricks | 294/88 X |
| 3,013,835 | 12/1961 | Blatt | 294/88 |
| 3,363,929 | 1/1968 | Nelson | 294/88 |
| 3,567,208 | 3/1971 | Blatt | 294/88 X |
| 3,734,556 | 5/1973 | Misawa | 294/88 |
| 3,865,424 | 2/1975 | Jabkowski | 294/88 |

*Primary Examiner*—John J. Love
*Assistant Examiner*—Johnny D. Cherry
*Attorney, Agent, or Firm*—Armstrong, Nikaido & Wegner

[57] ABSTRACT

A gripping device for use in an industrial robot or manipulator including a pair of clamp arms mounted on a base plate of the device and connected with a clamp arm operating rod through a pair of links and a cylinder-piston assembly having a misgrip detecting mechanism. One of the pair of clamp arms is shorter than the other clamp arm and is provided with an additional cramp arm swingable with respect to the short clamp arm. The misgrip detecting mechanism is operated by the action of a pressure switch provided in a hydraulic fluid conduit connected between the hydraulic fluid supplying source and a pressure chamber formed within the cylinder-piston assembly. Thus, the gripping device can positively and effectively grip a workpiece.

4 Claims, 7 Drawing Figures

GRIPPING DEVICE

BACKGROUND OF THE INVENTION

1. Field of the Invention

This invention relates to a gripping device for use in an industrial robot or an industrial manipulator, more particularly to an improvement of the gripping device which has a pair of novel clamp arms and a novel misgrip detecting mechanism.

2. Description of the Prior Art

Conventional gripping devices for use in an industrial robot or an industrial manipulator have a pair of mere clamp arms swingably mounted on a base plate of the device and connected with a clamp arm opening and closing rod, which is extended and retracted by means of a cylinder-piston assembly, through a pair of links, respectively, so that the pair of clamp arms are made to open and close for gripping a workpiece. Therefore, they cannot positively grip a workpiece, nor can they be adapted to grip workpieces having any size and any configuration in the most preferable gripping positions of the clamp arms.

On the other hand, a misgrip detecting mechanism in the conventional gripping devices has been so constructed that the stroke of the clamp arm opening and closing rod connected with the pair of clamp arms through the pair of links is detected by means of limit switches, thereby detecting the misgrip. However, in such construction at least a limit switch is inevitable required, and moreover such construction is complex and thus disadvantageous.

SUMMARY OF THE INVENTION

The present invention contemplates to eliminate the aforementioned disadvantages of the conventional gripping device.

It is, therefore, an object of the present invention to provide an improved gripping device for use in an industrial robot or an industrial manipulator which can be consistently adapted to positively grip a workpiece of any size and any condiguration in the most preferable gripping positions of a pair of clamp arms without causing a misgrip of the workpiece.

It is another object of the present invention to provide a novel misgrip detecting mechanism provided in the gripping device which can positively detect a misgrip using only pressure switches in hydraulic fluid conduits of a cylinder-piston assembly, respectively.

In order to accomplish the above described objects, there is provided in the present invention an improved gripping device in one embodiment which includes a pair of clamp arms swingably mounted on a base plate of the device and connected with a clamp arm opening and closing rod through a pair of links, and a cylinder-piston assembly for extending and retracting the clamp arm opening and closing rod so as to make the pair of clamp arms open and close for gripping a workpiece, wherein the gripping device is characterized in that one of the pair of clamp arms is shorter than the other clamp arm and is provided with an additional cramp arm as an added part thereof. The additional clamp arm has a projected pin provided on the surface thereof and is swingably connected with the distal end point of the short clamp arm at an intermediate portion thereof by means of a pivot pin. A long and slender hole extends in the swinging direction of the additional clamp arm and is formed on the surface thereof facing the additional clamp arm in the position opposite to the projected pin of the additional clamp arm. Chips for facilitating the gripping efficiency are formed, respectively, at each side end portion of the additional clamp arm and the portions of the other clamp arm opposite to the respective side end portions of the additional clamp arm.

Further, the gripping device is characterized in that the cylinder-piston assembly includes a misgrip detecting mechanism which comprises a cylinder tube, a cylindrical free piston having communicating holes at each side face thereof and reciprocatingly slidably inserted within the cylinder tube, thereby forming first and second pressure chambers at each side of the free piston in the cylinder tube an inner piston is fixedly secured to the clamp arm opening and closing rod and reciprocatingly inserted within the free piston with a circumferential space therebetween and which close tightly either communicating hole of a free piston so as to seal up the first or the second pressure chamber when the inner piston is abutted against either communicating hole. A first hydraulic fluid conduit is connected with the first pressure chamber of the cylinder tube through a first hydraulic fluid port formed in the cylinder tube, a second hydraulic fluid conduit is connected with the second pressure chamber of the cylinder tube through a second hydraulic fluid port formed in the cylinder tube, and pressure switches are provided in the first and second hydraulic fluid conduits, respectively.

And, in the gripping device thus constructed, the configuration, size, setting position, etc., of each construction element of the gripping part, that is, the clamp arms, links, pivot pins, etc., are previously selected and adjusted such that the pair of cramp arms including the additional clamp arm are closed and contact each other before both the free piston and the inner piston are simultaneously carried to their stroke ends on the side of extruding the clamp arm opening and closing rod when the free piston is moved together with the inner piston in a direction to extend the clamp arm opening and closing rod in such a manner that the communicating hole formed on the side of the first pressure chamber of the free piston is sealed by the side end face of the inner piston.

These and other objects, features and advantages of the present invention will become apparent from the following description taken in conjunction with the accompanying drawings.

DETAILED DESCRIPTION OF THE PREFERRED EMBODIMENT

Figure 1:
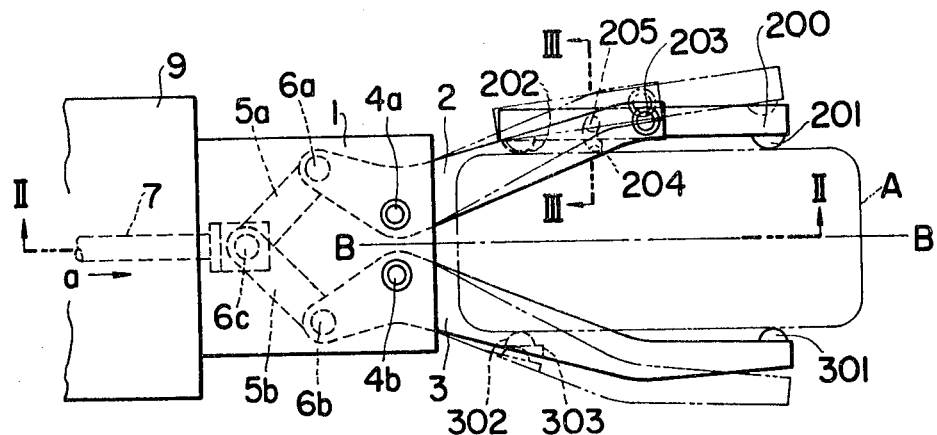
FIG. 1 is a fragmental plan view showing a gripping part of a gripping device of the present invention.
Figure 2:
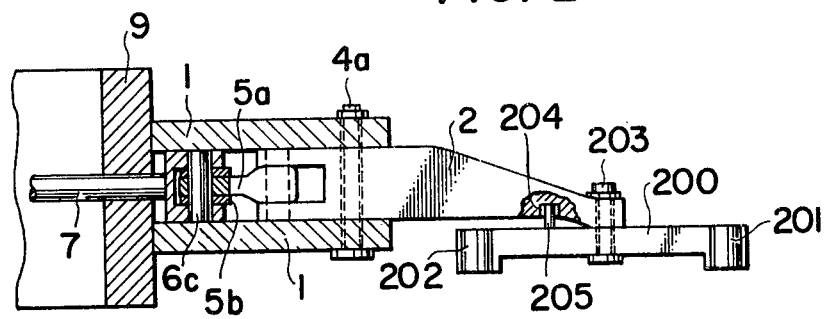
FIG. 2 is a fragmental partially cross sectional side view taken along a line II—II shown in FIG. 1.
Figure 3:
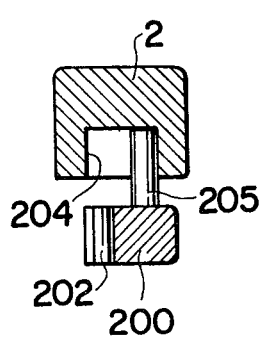
FIG. 3 is a partially enlarged cross sectional front view taken along a line III-III shown in FIG. 1.
Figure 4:
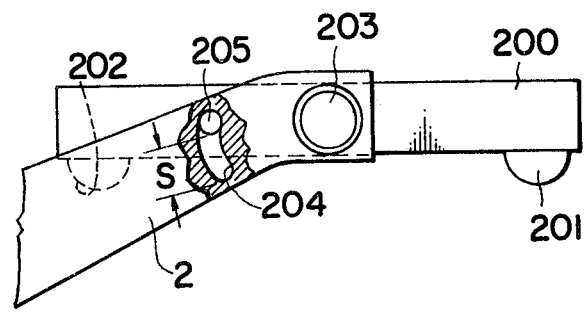
FIG. 4 is a fragmental partially sectional enlarged plan view showing one of a pair of clamp arms having an additional clamp arm of the gripping device according to the present invention.

Reference is now made to FIGS. 1 to 4, numeral 1 represents a base plate of the gripping device, and 2 and 3 are a pair of clamp arms swingably mounted on the base plate 1 by means of pivot pins 4a and 4b, respectively. The respective proximal ends of the clamp arms 2 and 3 are connected to the distal end of a cramp arm opening and closing rod 7 through a pair of links 5a and 5b, pivot pins 6a, 6b and 6c, and coupling. The clamp arm 2 is shorter than the clamp arm 3 and is provided with an additional clamp arm 200 as an added part thereof. The additional cramp arm 200 has a projected pin 205 provided on the surface thereof and is swingably connected to the distal end portion of the original short clamp arm at an intermediate point thereof by means of a pivot pin 203. A long and narrow hole 204 is formed on the surface of the clamp arm 2 facing the additional clamp arm 200, the hole extending in the swinging direction of the additional arm 200 so that the projected pin 205 provided on the surface of the additional clamp arm 200 is slidably engaged therewith. And further, the additional clamp arm 200 has chips 201 and 202 for facilitating the gripping efficiency at each side end portion on the surface thereof opposite to the other clamp arm 3, while on the clamp arm 3 chips 301 and 302 are also formed at the portions opposite to the chips 201 and 202 of the additional clamp arm 200, respectively. The chip 301 is formed at the distal end portion of the clamp arm 3 and the chip 302 is formed on the side of the proximal end thereof through a bracket 303.

In the device thus constructed, when the clamp arm opening and closing rod 7 is moved in the direction indicated by an arrow mark a, the pair of clamp arms 2 and 3 are simultaneously swung around the pivot pins 4a and 4b as are their respective fulcrums, respectively, so that the clamp arms 2 and 3 are closed from their respective positions illustrated by a two-point chain line shown in FIG. 1 to those illustrated by a full line, thereby gripping a workpiece A. In this case, depending upon the size and the configuration of the workpiece A the additional clamp arm 200 is also swung around the pivot pin 203 as is its fulcrum within the range of a distance S where the projected pin 205 of the additional arm 200 is capable of sliding itself within the hole 204 formed in the clamp arm 2 so that the workpiece A is positively gripped by the additional clamp arm 200 together with the pair of clamp arms 2 and 3 in cooperation with the respective chips 201, 202, 301 and 302, and thereby the workpiece A is always disposed on the gripping center line B—B of the pair of clamp arms 2 and 3.

Since the gripping device of the present invention has the aforementioned gripping part, it can positively grip a workpiece at a constant gripping position on the side of the clamp arm 3 in cooperation with the additional clamp arm 200 attached to the clamp arm 2 without misgripping the workpiece. In addition, as the swinging motion of the additional clamp arm 200 is controlled by the relationship of the projected pin 205 provided on the additional clamp arm 200 to the long and slender hole 204 formed in the clamp arm 2, the capacity of the swinging motion is extended by increasing the length of the hole 204. Therefore, the gripping device of the present invention can grip positively and effectively a workpiece of any size and any configuration.

Figure 5:
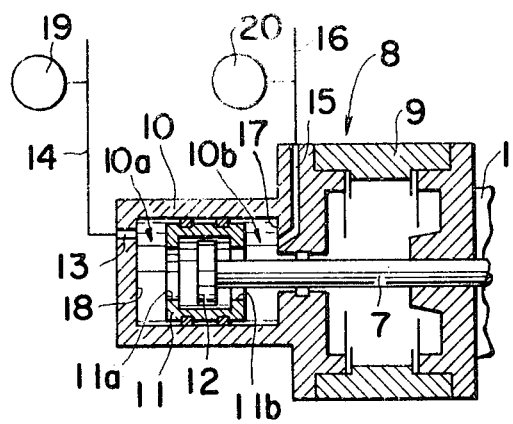
FIG. 5 is a fragmental partially cross sectional plan view showing a misgrip detecting mechanism of the gripping device according to the present invention.

Next, a misgrip detecting mechanism in the gripping device of the present invention is described with reference to FIGS. 5 to 7 as follows.

Reference numeral 8 represents a cylinder-piston assembly in the gripping device of the present invention which is fixedly secured to the base plate 1 of the gripping device for extending and retracting the clamp arm opening and closing rod 7. The cylinder-piston assembly 8 is constructed externally with a cylinder tube 10 and a hollow supporting member 9 where the clamp arm opening and closing rod 7 is supportingly and slidably run through. Within the cylinder tube 10, there is slidably inserted a cylindrical hollow free piston 11, thereby the inside of the cylinder tube 10 is divided into first and second pressure chambers 10a and 10b disposed at each side of the free piston 11. At both side end faces of the free piston 11, communicating holes 11a and 11b are formed, respectively. Further, within the free piston, there is reciprocatingly inserted an inner piston 12 in such a manner that a circumferential space t is left between the inner periphery of the free piston 11 and the outer periphery of the inner piston 12. The inner piston 12 is fixedly secured to the clamp arm opening and closing rod 7, and each side end face thereof may sealingly close either communicating hole 11a or 11b to seal the first pressure chamber 10a or the second pressure chamber 10b when the inner piston 12 abuts against either communicating hole 11a or 11b, respectively. The first and second pressure chambers 10a and 10b are connected with first and second hydraulic fluid conduits 14 and 16 through ports 13 and 15, respectively, and further the first and second conduits 14 and 16 are connected to the hydraulic fluid source (not shown) through a directional control valve (not shown). And, in the first and second hydraulic fluid conduits 14 and 16, there are respectively provided pressure switches 19 and 20.

In the gripping device of the present invention described above, the configuration, size, setting position, etc., of each construction element of the gripping part thereof, that is, the pair of clamp arms 2 and 3, the pair of links 5a and 5b, the pivot pins 4a and 4b, etc., are previously selected and adjusted such that the pair of clamp arms 2 and 3 including the additional clamp arm 200 are closed and contact each other first before both the free piston 11 and the inner piston 12 are simultaneously carried to their respective stroke ends for the extension of the clamp arm opening and closing rod 7 in such a manner that the communicating hole 11a formed on the side of the first pressure chamber 10a is sealed up by the side end face of the inner piston 12, that is, the inner side end face of the free piston 11 where the communicating hole 11a is formed and the side end face of the inner piston 12 sealingly contact each other.

Thus, when hydraulic fluid is supplied from the hydraulic fluid supplying source to the first pressure chamber 10a in the cylinder tube 10 via the first hydraulic fluid conduit 14 and the port 13, the free piston 11 is slidingly moved to the right. Then the communicating hole 11a of the free piston 11 formed in the first pressure chamber 10a is sealed by the inner piston 12 since the inner side end face of the free piston 11 where the communicating hole 11a is formed and the side end face of the inner piston 12 facing the communicating hole 11a sealingly contact each other. As a result, the first pressure chamber 10a is sealed up. After this, when the hydraulic fluid is further supplied into the first pressure chamber 10a, the free piston 11 and the inner piston 12 are simultaneously moved in a direction to move the clamp arm opening and closing rod 7 in the same state as the foregoing, so that the pair of clamp arms 2 and 3 including the additional clamp arm 200 are closed to grip the workpiece A through the action of the pair of links 5a and 5b, respectively. Once the workpiece A is gripped, the clamp arm opening and closing rod 7 is not moved further since not only the pair of clamp arms 2 and 3 including the additional clamp arm 200 but also the pair of links 5a and 5b are held in the stationary state. As a result, the hydraulic pressure within the first pressure chamber 10a is risen as has the pressure in the first hydraulic fluid conduit 14, thereby switching the pressure switch 19 provided in the conduit 14 into "ON". Therefore, it is represented that the workpiece A is positively gripped by the pair of clamp arms 2 and 3 including the additional clamp arm 200.

Figure 6:
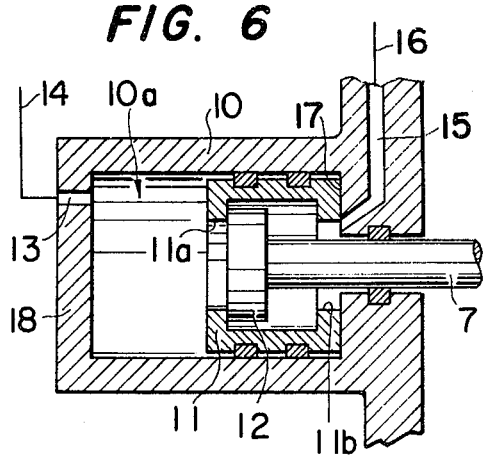
FIGS. 6 and 7 are fragmental partially cross sectional enlarged plan view showing the operation of the misgrip detecting mechanism as shown in FIG. 5.
Figure 7:
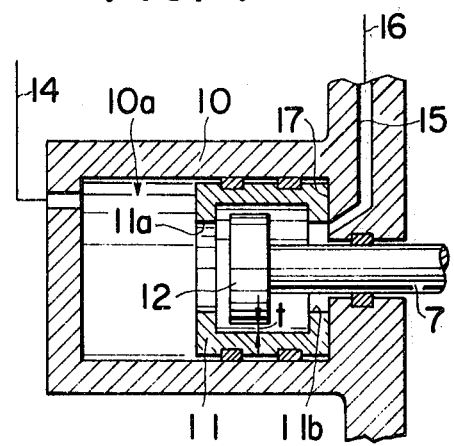

If the pair of clamp arms 2 and 3 including the additional clamp arm 200 misgrip the workpiece A, the free piston 11 and the inner piston 12 are simultaneously moved further in the direction of extension the clamp arm opening and closing rod 7 until the free piston 11 is abutted against the inner side end face 17 of the cylinder tube 10 which is on the extended side of the clamp arm opening and closing rod 7 as shown in FIG. 6, and then only the inner piston 12 is further moved in the same direction as described above. And, the inner piston 12 is stopped at the intermediate position within the free piston 11, as shown in FIG. 7, because the pair of clamp arms 2 and 3 including the additional clamp arm 200 are closed and contact with each other before the inner piston 12 sealingly abuts against the inner side end face of the free piston 11 where the communicating hole 11b is formed. As a result, hydraulic fluid supplied into the pressure chamber 10 is fed out to the second hydraulic fluid conduit 16 via the port 15. Therefore, the misgripping is determined by the fact that the pressure switch 19 provided in the first hydraulic fluid conduit 14 is not switched into "ON" because the hydraulic pressure within the first pressure chamber 10a and the first conduit 14 has not risen.

When hydraulic fluid is supplied into the second pressure chamber 10b via the second hydraulic fluid conduit 16 and the port 15, the operations of the free piston 11 and the inner piston 12 within the cylinder tube 10 is reversed, thus the pair of clamp arms 2 and 3 including the additional clamp arm 200 are acted to unclamp the workpiece A by their respective opening swinging motions.

Thus, a certain representative embodiment and details have been described and shown for the purpose of illustrating the present invention, it will be apparent to those who skilled in the art that various changes and modifications may be made therein without departing from the spirit or scope of the this invention.

What is claimed is:

1. In a workpiece gripping device including a pair of clamp arms pivotally mounted on a base plate, said clamp arms being connected to a clamp arm opening and closing rod through a pair of links, the improvement wherein one of said pair of clamp arms is shorter than the other clamp arm and an additional clamp arm is pivotally connected to said shorter clamp arm, said additional clamp arm including a pin projecting from the surface thereof, said short clamp arm including a long, narrow hole extending in the swinging direction of said additional clamp arm and formed on the surface thereof facing said additional clamp arm in a position opposite to said pin projecting from said additional clamp arm, whereby the pivotal movement of said additional clamp arm is limited by said pin in said slot.

2. The workpiece gripping device of claim 1, further including chip means fixed to the end portions of said additional clamp arm and said longer clamp arm for facilitating the gripping efficiency of said device.

3. The workpiece gripping device of claim 2, further including misgrip detecting means for detecting the misgripping of said workpiece.

4. The workpiece gripping device as claimed in claim 3, wherein said misgrip detecting means comprises a cylinder tube, a cylindrical free piston having communicating holes at each side face thereof slidably inserted within said cylinder tube, thereby forming first and second pressure chambers at each side of said free piston within said cylinder tube, an inner piston fixedly secured to said clamp arm opening and closing rod and reciprocatingly inserted within said free piston, the diameter of said inner piston being less than the inner diameter of said free piston thereby leaving a circumferential space between the inner periphery of said free piston and the outer periphery of said inner piston said inner piston sealing closing either of said communicating holes to seal said first or second pressure chamber when said inner piston abuts either side end face of said free piston, a first hydraulic fluid conduit connected with said first pressure chamber within said cylinder tube through a first hydraulic fluid port formed in said cylinder tube, a second hydarulic fluid conduit connected with said second pressure chamber within said cylinder tube through a second hydraulic fluid port formed in said cylinder tube, and pressure switches provided in said first and second hydraulic fluid conduits, respectively, wherein said pair of clamp arms including said additional clamp arm contact each other before both said free piston and inner piston are simultaneously carried to their respective stroke ends when said free piston is moved together with said inner piston in a direction to extend said clamp arm opening and closing rod from said cylinder tube such that said communicating hole formed on the side of said first pressure chamber of said free piston is sealed by the side end face of said inner piston.

* * * * *